(12) United States Patent
Kane et al.

(10) Patent No.: US 8,157,104 B2
(45) Date of Patent: Apr. 17, 2012

(54) APPARATUS FOR SUPPORTING A VACUUM FILTRATION DEVICE

(75) Inventors: Jeffrey F. Kane, Hudson, MA (US); Thomas Taylor, Windham, NH (US); Vito Lore, Somerville, MA (US); Sean Landis Phillips, Lancaster, MA (US)

(73) Assignee: Roush Life Sciences, LLC, Livonia, MI (US)

( * ) Notice: Subject to any disclaimer, the term of this patent is extended or adjusted under 35 U.S.C. 154(b) by 1069 days.

(21) Appl. No.: 12/023,820

(22) Filed: Jan. 31, 2008

(65) Prior Publication Data

US 2009/0026154 A1 Jan. 29, 2009

Related U.S. Application Data

(60) Provisional application No. 60/952,010, filed on Jul. 26, 2007, provisional application No. 60/952,011, filed on Jul. 26, 2007, provisional application No. 60/952,012, filed on Jul. 26, 2007, provisional application No. 60/952,013, filed on Jul. 26, 2007.

(51) Int. Cl.
*B01D 35/00* (2006.01)
(52) U.S. Cl. ........................................ 210/406; 210/808
(58) Field of Classification Search .................. 210/808, 210/406; 248/154; 269/284
See application file for complete search history.

(56) References Cited

U.S. PATENT DOCUMENTS

| 1,168,988 A | 1/1916 | Zimmermann | |
| 1,216,112 A | 2/1917 | Greven | 210/477 |
| 1,501,073 A | 7/1924 | Stead | 210/478 |
| 2,367,794 A | 1/1945 | Marselus | 210/159 |
| 2,460,423 A | 2/1949 | Kracklauer | 210/479 |
| 2,584,206 A | 2/1952 | Hodsdon | 210/445 |
| 2,608,843 A | 9/1952 | Kennedy et al. | 65/65 |
| 2,755,935 A * | 7/1956 | Richards | 210/250 |
| 2,818,178 A | 12/1957 | Hodsdon | 210/445 |
| 3,010,583 A | 10/1959 | Kenyon | 210/406 |
| 3,085,705 A | 4/1963 | Varney | 215/41 |
| 3,286,866 A | 11/1966 | McIntosh | 215/40 |
| 3,295,686 A | 1/1967 | Krueger | 210/455 |
| 3,319,792 A | 5/1967 | Leder et al. | 210/238 |
| 3,469,369 A | 9/1969 | Helmke | 95/259 |

(Continued)

FOREIGN PATENT DOCUMENTS

DE 403858 10/1924

(Continued)

OTHER PUBLICATIONS

European Patent Office, International Search Report and Written Opinion of the International Searching Authority—Application No. PCT/US2008/052678, dated Jun. 5, 2008 (10 pages).

(Continued)

*Primary Examiner* — Chester Barry
(74) *Attorney, Agent, or Firm* — Sunstein Kann Murphy & Timbers LLP

(57) ABSTRACT

A portable fixture for supporting a vacuum filtration device includes a cradle portion and a clamping portion. The cradle portion supports the vacuum filtration device. The clamping portion removeably attaches the portable fixture to a support in order to secure and support the filtration device above a workspace. The portable fixture may also provide a vacuum to the filtration device. To that end, the portable fixture may have a vacuum inlet port which may be connected to a vacuum source and a vacuum outlet port that is fluidly connected to the vacuum inlet port.

13 Claims, 7 Drawing Sheets

U.S. PATENT DOCUMENTS

| | | | |
|---|---|---|---|
| 3,478,889 A | 11/1969 | Fessler | 210/406 |
| 3,730,352 A | 5/1973 | Cohen et al. | 210/332 |
| 3,752,651 A | 8/1973 | Bush | 23/230 R |
| 3,838,978 A | 10/1974 | Eddleman et al. | 23/292 |
| 3,956,125 A * | 5/1976 | Strutt et al. | 210/94 |
| 4,013,076 A | 3/1977 | Puderbaugh et al. | 128/276 |
| 4,052,163 A | 10/1977 | Patzner | 23/259 |
| 4,247,399 A | 1/1981 | Pitesky | 210/341 |
| 4,251,366 A | 2/1981 | Simon et al. | 210/767 |
| 4,301,010 A | 11/1981 | Eddleman et al. | 210/406 |
| 4,357,240 A | 11/1982 | Mehra et al. | 210/455 |
| 4,394,266 A | 7/1983 | Mehra et al. | 210/244 |
| 4,468,321 A | 8/1984 | St. John | 210/232 |
| 4,521,308 A | 6/1985 | Brimhall, Jr. et al. | 210/330 |
| 4,523,934 A | 6/1985 | Joshua | 55/189 |
| 4,614,585 A | 9/1986 | Mehra et al. | 210/433.2 |
| 4,673,501 A | 6/1987 | Wells et al. | 210/406 |
| 4,678,572 A | 7/1987 | Hehl | 210/232 |
| 4,678,576 A | 7/1987 | Leoncavallo | 210/433.2 |
| 4,689,147 A | 8/1987 | Leoncavallo et al. | 210/232 |
| 4,702,834 A | 10/1987 | Relyea | 210/321.78 |
| D297,860 S | 9/1988 | Leoncavallo et al. | D24/8 |
| 4,783,318 A | 11/1988 | Lapakko | 422/101 |
| 4,792,398 A | 12/1988 | Klein | 210/406 |
| 4,832,841 A | 5/1989 | Gutman et al. | 210/232 |
| 4,849,061 A | 7/1989 | Relyea | 156/308.4 |
| 4,894,155 A | 1/1990 | Leoncavallo et al. | 210/321.84 |
| 4,944,876 A | 7/1990 | Miller | 210/321.75 |
| 5,112,484 A | 5/1992 | Zuk, Jr. | 210/247 |
| 5,116,496 A | 5/1992 | Scott | 210/232 |
| 5,141,639 A | 8/1992 | Kraus et al. | 210/321.75 |
| 5,205,989 A | 4/1993 | Aysta | 422/101 |
| 5,227,137 A | 7/1993 | Monti et al. | 422/101 |
| 5,234,585 A | 8/1993 | Zuk, Jr. | 210/188 |
| 5,264,184 A | 11/1993 | Aysta | 422/101 |
| 5,283,039 A | 2/1994 | Aysta | 422/104 |
| 5,308,483 A | 5/1994 | Sklar et al. | 210/232 |
| 5,375,477 A | 12/1994 | Neill et al. | 73/863.23 |
| 5,447,079 A | 9/1995 | Neill et al. | 73/863.23 |
| 5,603,900 A | 2/1997 | Clark et al. | 422/101 |
| 5,785,927 A | 7/1998 | Scott et al. | 422/104 |
| 5,792,425 A | 8/1998 | Clark et al. | 422/101 |
| 5,849,249 A | 12/1998 | Jones, Jr. et al. | 422/101 |
| 5,873,967 A | 2/1999 | Clark et al. | 156/70 |
| 5,948,246 A | 9/1999 | Zuk, Jr. | 210/188 |
| 6,159,368 A | 12/2000 | Moring et al. | 210/321.75 |
| 6,287,849 B1 | 9/2001 | McNerney et al. | 435/287.1 |
| 6,338,802 B1 | 1/2002 | Bodner et al. | 210/650 |
| 6,358,730 B1 | 3/2002 | Kane | 435/297.5 |
| 6,379,625 B1 | 4/2002 | Zuk, Jr. | 422/101 |
| 6,419,827 B1 | 7/2002 | Sandell et al. | 210/321.75 |
| 6,443,314 B2 | 9/2002 | Shiraiwa et al. | 210/474 |
| 6,451,261 B1 | 9/2002 | Bodner et al. | 422/99 |
| 6,458,278 B1 | 10/2002 | Leoncavallo et al. | 210/650 |
| 6,491,873 B2 | 12/2002 | Roberts et al. | 422/101 |
| 6,506,343 B1 | 1/2003 | Bodner et al. | 422/65 |
| 6,720,417 B1 | 4/2004 | Walter | 536/25.4 |
| 6,770,203 B2 | 8/2004 | Leoncavallo et al. | 210/650 |
| 6,783,732 B2 | 8/2004 | Madden et al. | 422/63 |
| 6,913,152 B2 | 7/2005 | Zuk, Jr. | 210/406 |
| 6,951,762 B2 | 10/2005 | Zuk, Jr. | 436/180 |
| 6,986,849 B2 | 1/2006 | Irvine | 210/791 |
| 7,011,755 B2 | 3/2006 | Zuk, Jr. | 210/416.1 |
| 2002/0096468 A1 | 7/2002 | Zuk, Jr. | 210/455 |
| 2002/0098125 A1 | 7/2002 | Roberts et al. | 422/101 |
| 2003/0010708 A1 | 1/2003 | Leocavallo et al. | 210/477 |
| 2003/0080045 A1 | 5/2003 | Zuk, Jr. | 210/416.1 |
| 2005/0023172 A1 | 2/2005 | Ide et al. | 206/446 |
| 2005/0178216 A1 | 8/2005 | Pitt et al. | 73/863.23 |
| 2007/0144959 A1 * | 6/2007 | Zuk | 210/473 |

FOREIGN PATENT DOCUMENTS

| | | |
|---|---|---|
| DE | 33 06 599 | 8/1984 |
| EP | 0 075 687 | 4/1983 |
| EP | 0 857 961 A2 | 8/1988 |
| EP | 0 223 323 | 5/1990 |
| EP | 0 618 833 | 12/1992 |
| EP | 1 031 371 | 8/2000 |
| EP | 1 145 752 | 10/2001 |
| GB | 2 250 927 | 6/1992 |
| WO | WO 93/12853 | 7/1993 |
| WO | WO 95/04585 | 2/1995 |
| WO | WO 98/32875 | 7/1998 |
| WO | WO 2007/028157 | 3/2007 |

OTHER PUBLICATIONS

The International Bureau of WIPO, International Preliminary Report on Patentability—Application No. PCT/US2008/052678, dated Jan. 26, 2010 (8 pages).

* cited by examiner

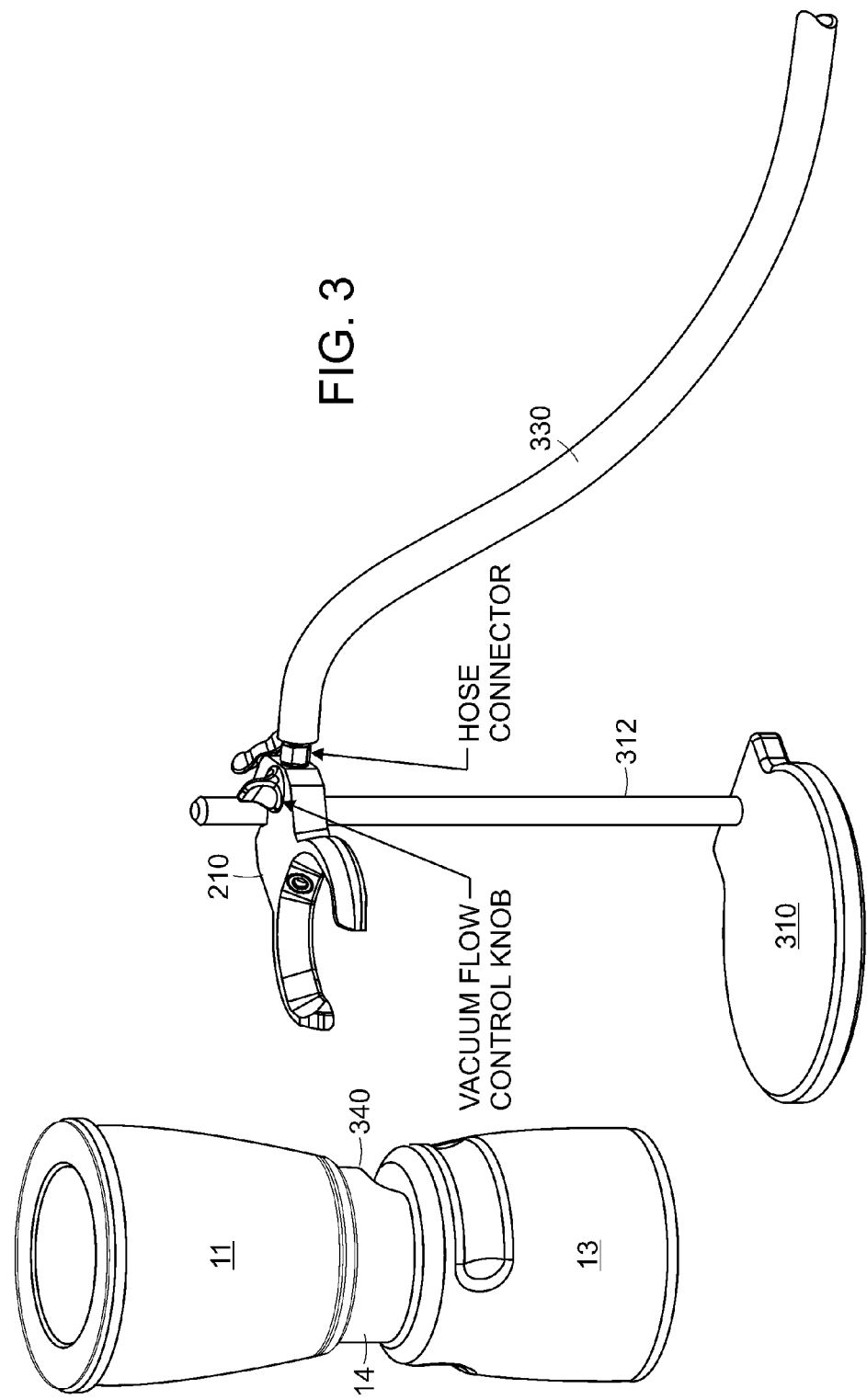

APPARATUS FOR SUPPORTING A VACUUM FILTRATION DEVICE

The present application claims priority from U.S. Provisional Application No. 60/952,010, entitled "Vacuum Bottle", No. 60/952,011, entitled "Vacuum Base," No. 60/952,012, entitled "Vacuum Collar," and No. 60/952,013, entitled "Vacuum Controller," all of which were filed Jul. 26, 2007 and the full disclosures of which are hereby incorporated by reference herein. The present application is related to applications with the following titles and attorney docket numbers, "Methods and Apparatus for Foam Control in a Vacuum Filtration System," Ser. No. 12/023,685; "Vacuum Base and Related Methods and Apparatus for Vacuum Filtration," Ser. No. 12/023,711; "Methods and Apparatus for Filtrate Storage Handling," Ser. No. 12/023,757, all filed on the same date herewith, the full disclosures of which are hereby incorporated by reference herein.

FIELD OF THE INVENTION

The present invention relates to liquid filtration, and particularly to an apparatus for supporting a vacuum filtration device for filtering liquid samples.

BACKGROUND ART

Entities such as pharmaceutical companies and university research labs commonly use vacuum filtration sterilization of biological fluids such as cell culture media and buffer solutions. This typically involves what are referred to as bottle-top filters such as the three-piece example shown in FIG. 1. A bottle-top filter device 10 includes an upper unfiltered sample reservoir 11 which is removable and disposable. The sample reservoir 11 includes a filter 12 which typically includes a polyethersulfone (PES) or cellulose-based membrane for sterilized filtering of the sample liquid. The upper rim of the sample reservoir 11 may receive a removable cover that protects the sample liquid from contamination. On the bottom is a filtrate storage bottle 13 for collecting the liquid filtrate, and in between is a vacuum collar 14 with a vacuum port for manual coupling of a vacuum source. Vacuum is applied downstream of the filter 12 to create a pressure differential which draws the sample liquid through the filter into the storage bottle 13. The upper rim of the storage bottle 13 may be adapted to receive a cap to close the container after filtering once it is disconnected from the vacuum collar 14. These components are normally sold pre-sterilized.

Such products and processes have various inherent challenges. For example potential spills are a significant concern. A spill can disrupt production for up to an entire day and require use of a sanitizing laminar hood. The need for manual attachment of the vacuum source to the vacuum port of the vacuum collar 14 may lead to problems with instability and risk of spillage.

When vacuum filtration systems are used with cell cultures, another concern is foaming. Filtrate pulled through the filter is apt to fall into the storage bottle and splash. Splashing can cause foaming of the filtered sample, a condition that can have detrimental effects on the cell cultures. Splashing and foaming can be caused by a variety of factors including the velocity at which the filtrate passes through the filter and the distance that it must fall before hitting the storage bottle or filtrate level within the storage bottle. The greater the velocity and distance, the more the filtrate is likely to foam.

SUMMARY OF THE INVENTION

A portable fixture for supporting a vacuum filtration device (e.g., a bottle-top filter device) includes a cradle portion and an clamping portion. The cradle portion supports the vacuum filtration device. The clamping portion may be used to removeably attach the portable fixture to a support, such as a common ring stand. The portable fixture may also include a vacuum inlet port, and a vacuum outlet port fluidly connected to the vacuum inlet port for providing a vacuum to the filtration device. The cradle portion may be moveable relative to the clamping portion so as to hold the filtration device at a tilted non-vertical angle.

The portable fixture may also have a securing mechanism located on the clamping portion. The securing mechanism may be tightened and loosened to secure and unsecure the portable fixture to the support (e.g., the ring stand). For example, the securing mechanism may be a clamping screw passing through the clamping portion and configured to engage the support.

The vacuum inlet port may include a hose barb that can be used to connect the portable fixture to a vacuum (e.g., using a hose). When the filtration device is supported by the portable fixture, the vacuum outlet port may engage a vacuum port on the vacuum filtration device. The vacuum outlet port may also include a seal disposed around the vacuum outlet port. The seal minimizes leakage between the vacuum outlet port and the vacuum port on the filtration device.

In accordance with other embodiments, the portable fixture may also include a vacuum controller that allows a user to control the vacuum pressure supplied to the filtration device through the vacuum outlet port and the vacuum inlet port. For example, the vacuum controller may be a knob located on the cradle portion. The control knob may have a detented OFF position for venting to atmosphere so that no vacuum pressure is provided to the filtration device.

In accordance with still further embodiments, the cradle portion may also include registration details for orienting the vacuum filtration device on the portable fixture. The registration details may include at least one support surface (e.g., on the cradle portion) for supporting a corresponding surface on the vacuum filtration device. One of the support surfaces may be the vacuum outlet port and the corresponding surface on the vacuum filtration device may be the vacuum port.

In accordance with other embodiments of the present invention, a method for supporting a vacuum filtration device includes securing a portable fixture to a support and engaging the filtration device with the portable fixture. The portable fixture may include a cradle portion for supporting the vacuum filtration device and an clamping portion for removably attaching the portable fixture to the support. The filtration device may be engaged with the portable fixture such that a vacuum outlet port on the cradle portion aligns with a vacuum port on the filtration device.

The method may also involve securing the portable fixture to the support by tightening a securing mechanism located on the clamping portion. Tightening the securing mechanism may engage the securing mechanism with the support. Moreover, engaging the filtration device with the portable fixture may include registering the vacuum filtration device with registration details on the cradle portion.

In accordance with still further embodiments, a method for filtering liquid may include the steps described above with respect to supporting the vacuum filtration device. Additionally, the method may include connecting the vacuum inlet port (which is fluidly connected to the vacuum outlet port) located on the portable fixture to a vacuum pump and depositing a liquid sample into an upper reservoir of the filtration device. The method may then apply a vacuum to the filtration device via the vacuum inlet port and the vacuum outlet port on the portable fixture. To control the vacuum applied to the filtration device and control foaming of the filtered liquid sample, the method may adjust a vacuum controller located on the portable fixture. Additionally or alternatively, the method may include tilting the cradle portion with respect to the clamping portion, thereby tilting the filtration device and causing the filtered liquid sample to flow along a sidewall of a storage bottle of the filtration device and reducing the amount of foaming within the storage bottle.

BRIEF DESCRIPTION OF THE DRAWINGS

FIG. 3 schematically shows the portable fixture shown in FIGS. 2A-2C secured to a ring stand in accordance with embodiments of the present invention.

DETAILED DESCRIPTION OF SPECIFIC EMBODIMENTS

Figure 1:
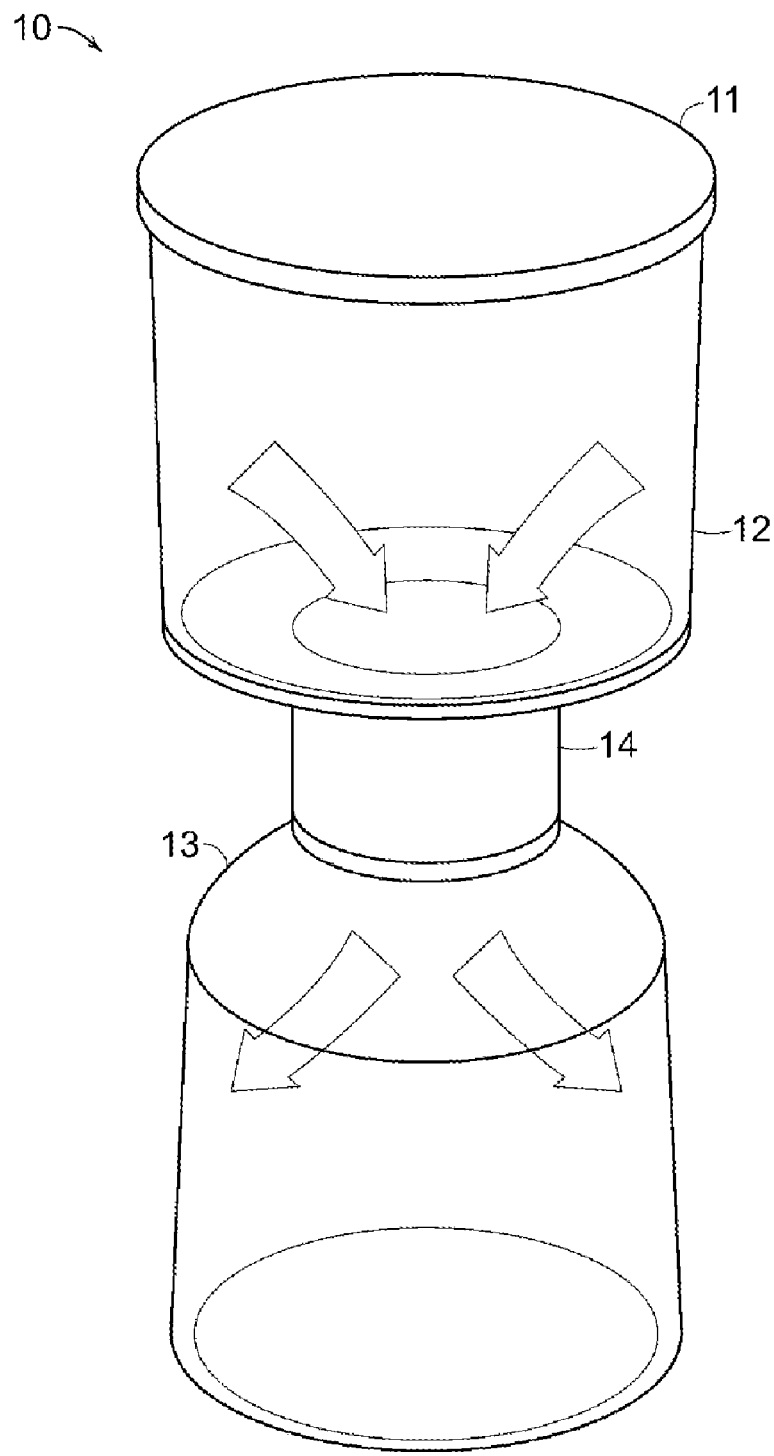
FIG. 1 shows an example of a liquid filtration device according to the prior art.
Figure 2A:
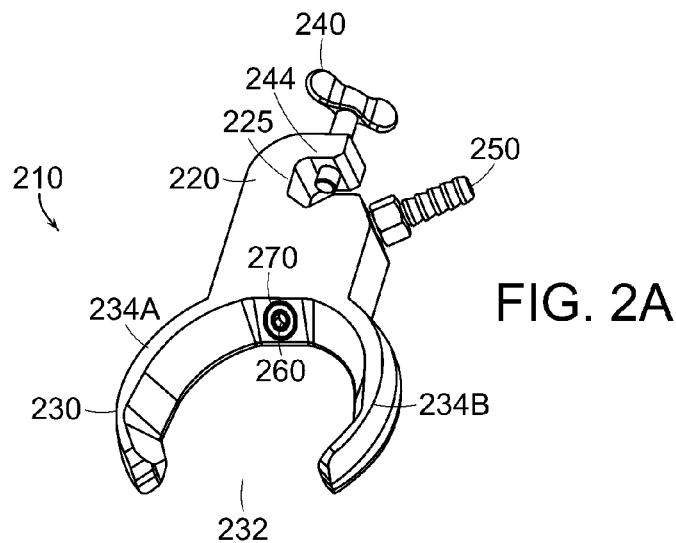
FIGS. 2A-2C schematically show an embodiment of a portable fixture for supporting a liquid filtration device in accordance with the present invention.
Figure 2B:
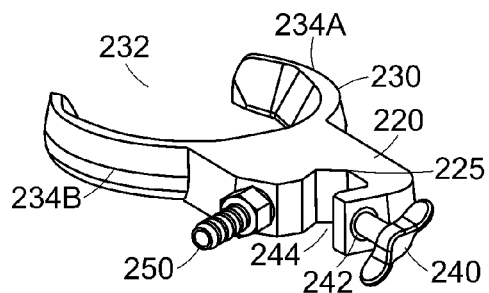
Figure 2C:
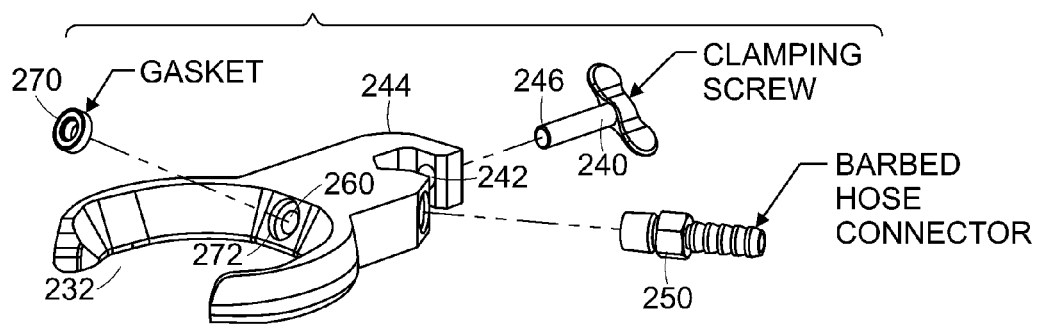

Referring now to FIGS. 2A-2C, a portable fixture 210, in accordance with embodiments of the present invention, may be used in conjunction with a common ring stand to support a liquid filtration device (e.g., similar to that shown in FIG. 1) and prevent tipping. The portable fixture 210 essentially includes two portions. The first portion, the clamping portion 220, allows the portable fixture 210 to be attached to a support, for example, a standard ring stand 310 (FIG. 3). To facilitate attachment and coupling to the ring stand 310, the clamping portion 220 may include a recess 225 in which a support arm 312 of the ring stand 310 may be inserted. Although shown as a recess 225, the clamping portion 220 may have other features that facilitate coupling with the support arm 312. For example, the clamping portion 220 may have a through-hole. In such embodiments, the clamping portion 220 (and therefore the portable fixture 210) may simply be slid over the top of the support arm 312.

Additionally, the clamping portion 220 may have a securing mechanism to help secure the portable fixture 210 to the support arm 312. For example, the clamping portion may include a clamping screw 240 that threads into a threaded hole 242 passing through a wall 244 of the clamping portion 220. The clamping screw 240 may be tightened or loosened (e.g., by screwing and unscrewing). As the clamping screw 240 is tightened (e.g., screwed further into the threaded hole 242), the end 246 of the clamping screw 240 will engage the support arm 312 and secure the portable fixture 210 to the ring stand 310. Conversely, as the clamping screw 240 is loosened (e.g., unscrewed from the threaded hole 242), the end 246 of the clamping screw 240 will disengage from the support arm 312, allowing the portable fixture 210 to be removed from the ring stand 310. Although the securing mechanism is described as a clamping screw 240 above, a variety of other mechanisms may be used to secure the portable fixture 210 to the support arm 312. For example, the securing mechanism may be a strap, a locking pin, or a magnetic rod, to name but a few.

In addition to the clamping portion 220, the portable fixture also has a cradle portion 230. The cradle portion 230 supports the filtration device 10 when it is engaged with the portable fixture 210. As shown in FIGS. 2A-2C, the cradle portion 210 may be C-shaped such that the opening 232 may slide over the vacuum collar 14 (or, as described in greater detail below, into a loading channel 340, FIG. 3) and the arms 234A and 234B support the filtration device 10, for example, from the underside of the upper sample reservoir 11, FIG. 4.

In addition to supporting and stabilizing the filtration device 10, the portable fixture 210 may also be used to provide the vacuum required to filter a liquid sample. In particular, the portable fixture 210 may include a vacuum inlet port 250 (e.g., a barbed hose connection) that may be used to connect the portable fixture to a vacuum (not shown) via a hose 330, FIGS. 3 and 4. Within the portable fixture 210, a fluid conduit fluidly connects the vacuum inlet port 250 with a vacuum outlet port 260 located in the cradle portion 230. When the filtration device 10 is properly engaged with the portable fixture 210, the vacuum outlet port 260 aligns with a vacuum port 505, FIG. 5, on the filtration device (e.g., within the vacuum collar 14). Therefore, the vacuum pump is able to provide a vacuum to the filtration device 10 via the vacuum inlet port 250, fluid conduit, and vacuum outlet port 260.

It is important to note that in some embodiments, the vacuum inlet port 250 (e.g., the hose barb) may be removable. Such embodiments provide a user with flexibility when connecting the portable fixture 210 to a vacuum. For example, if the vacuum inlet port 250 has a ¼ inch hose barb connection but the user only has a ⅛ inch hose, the user may simply remove the vacuum inlet port 250 and replace it with the appropriately sized hose barb.

To minimize and/or prevent leakage between the vacuum port 505 on the filtration device 10 and the vacuum outlet port 260, the portable fixture 210 may include a seal disposed around the vacuum outlet port 260. For example, the seal may be an annular gasket 270 or O-ring set into a seal recess 272. Therefore, when the filtration device 10 is properly engaged with the portable fixture 210 (e.g., as shown in FIG. 4), the weight of the filtration device on the cradle portion 230 and the gasket 270 will create a seal (e.g., by slightly deforming the gasket 270) between the vacuum outlet port 260 and the vacuum port 505 on the filtration device 10.

As mentioned above, in order to supply a vacuum to the filtration device using the portable fixture 210, the filtration device 10 must be properly aligned within the cradle portion 230 (e.g., the vacuum port 505 must align with the vacuum outlet port 260). To help properly align the filtration device 10, the cradle portion 230 may have a number of registration features. For example, as shown in FIG. 5, an embodiment of the present invention may include registration features 510, 512, and 514 for orienting the filtration device 10 in a single fixed radial direction. As shown in FIGS. 3 and 4, some filtration devices 10 may include a loading channel 340 having within it a set of registration features 410, 412, and 414 that correspond to the cradle portion registration features 510, 512, and 514. For example, application No. 60/952,013 entitled "Vacuum Collar" (filed Jul. 26, 2007), and the application entitled "Methods and Apparatus for Foam Control in a Vacuum Filtration System," filed on even date herewith disclose such filtration devices.

Figure 4:
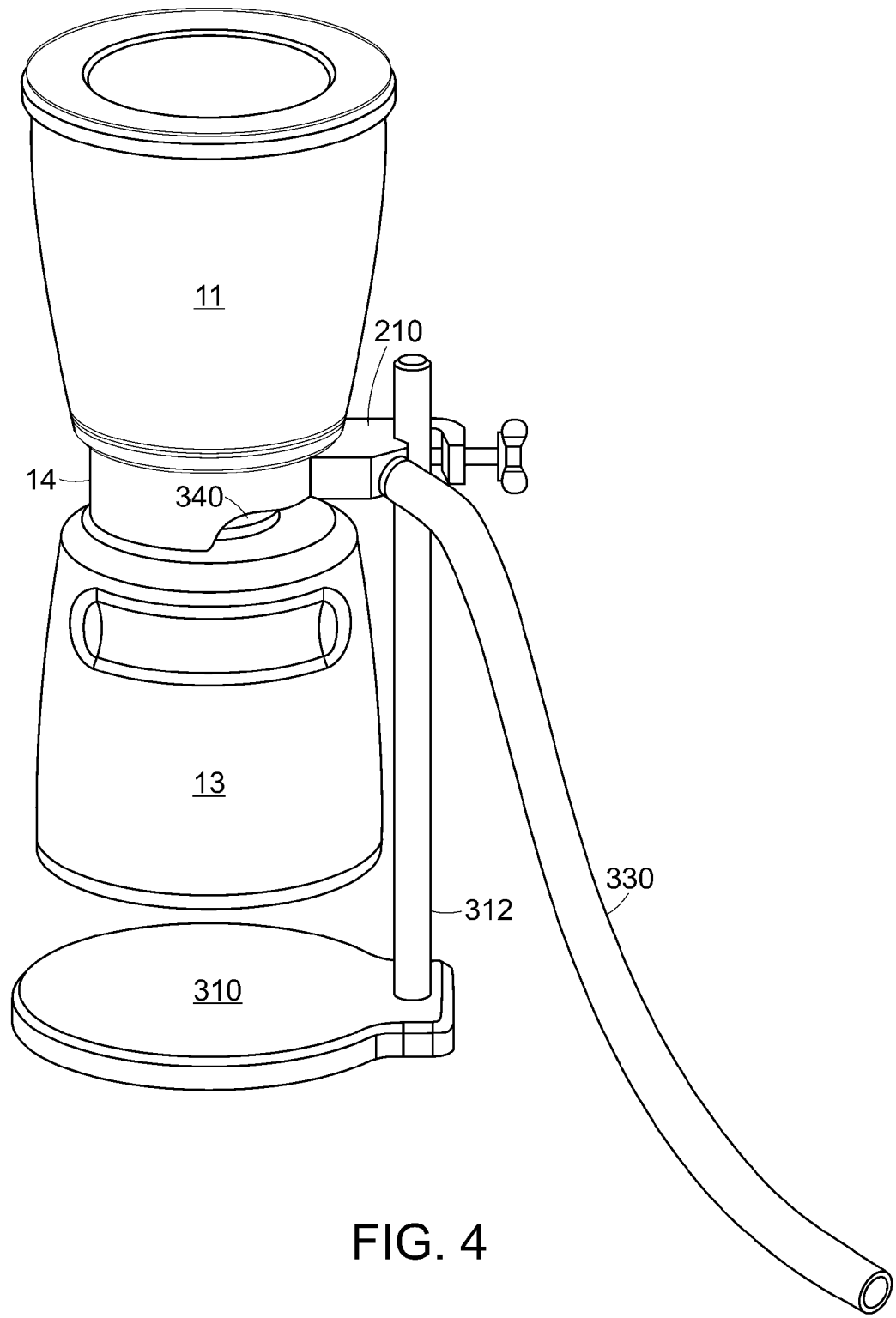
FIG. 4 schematically shows the portable fixture shown in FIGS. 2A-2C secured to a ring stand and supporting a filtration device similar to that shown in FIG. 1 according to embodiments of the present invention.
Figure 5:
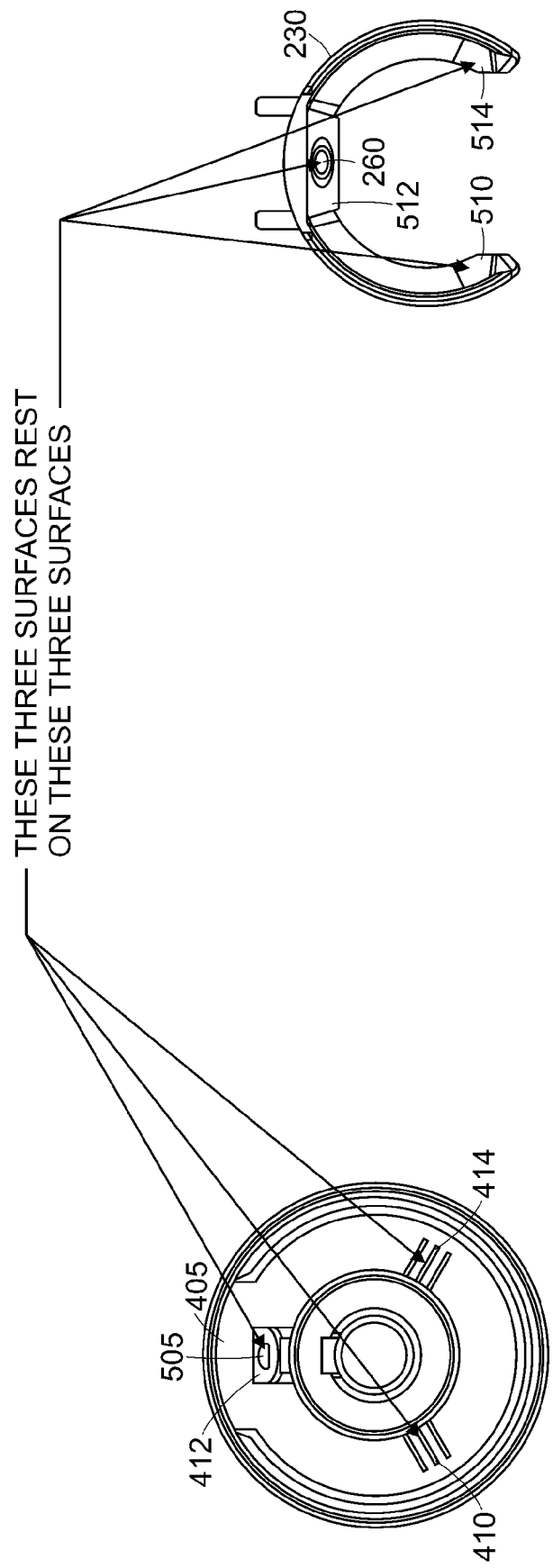
FIG. 5 schematically shows registration details of the portable fixture in accordance with embodiments of the present invention.

In such embodiments, the filtration device 10 is docked on/engaged with the portable fixture 210 by lowering the loading channel 340 over the cradle portion 230, such that the support arms 234A and 234B are within the loading channel 340, FIG. 4. The vacuum collar 14 may also have an open area that fits over the portable fixture 210 and facilitates the alignment of the filtration device registration features 410, 412, 414 with the cradle portion registration features 510, 512, and 514. The collar 14 guides the filter assembly 10 onto the cradle portion 230 until the registration features mate, FIG. 4. Once in place, the vacuum outlet port 260 is automatically aligned with and sealed against the vacuum port 505 so that the vacuum provided through the fluid conduit in the portable fixture 210 is in communication with the filtration device 10. The vacuum port 505 and the vacuum outlet port 260 may also be beveled so that the weight of the filter assembly urges the ports together to form a more effective seal. In such embodiments, the vacuum port 505 and the vacuum outlet port 260 may act as one pair of the registration details. Further, in some embodiments, the other registration details may also be beveled to compensate for any manufacturing tolerances within the portable fixture 210 and the filtration device 10. The registering process can quickly and easily be performed one handed to provide convenient "load and go" functionality.

Figure 6A:
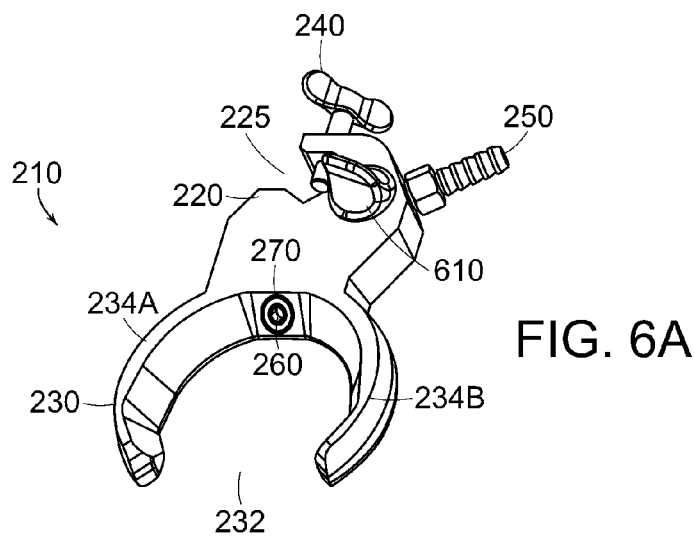
FIGS. 6A-6C shows an alternative embodiment of the portable fixture having vacuum flow control in accordance with embodiments of the present invention.
Figure 6B:
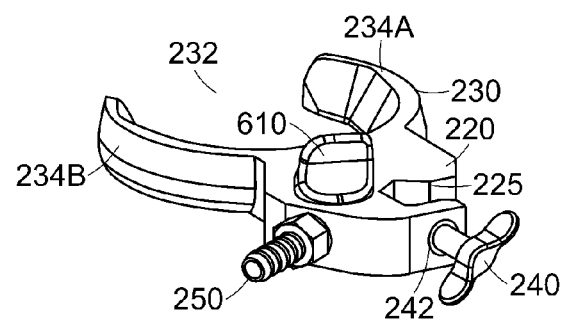
Figure 6C:
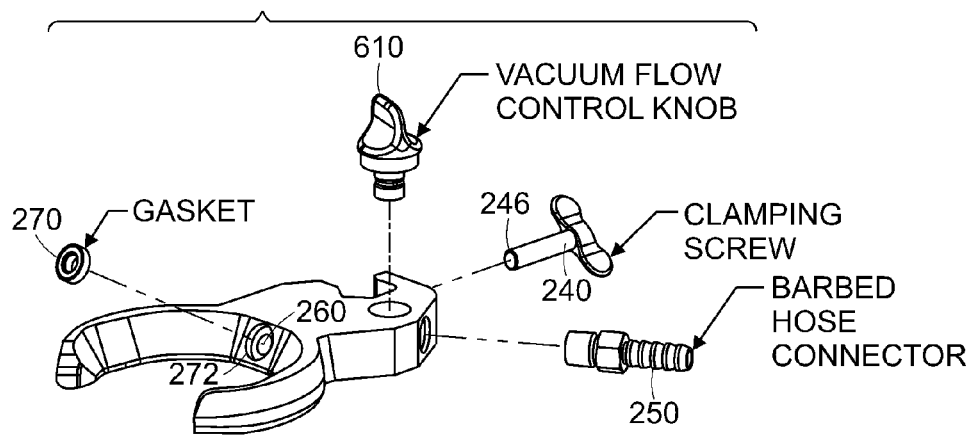

Splashing within the storage bottle 13 can cause the filtered liquid to foam, which is detrimental to the integrity of the filtered sample. As mentioned above, the velocity at which the filtered solution falls into the storage bottle 13 and the distance that the solution must fall contribute significantly to the amount of splashing. The splashing and foaming can be minimized by adjusting the vacuum so as not to draw the fluid too vigorously down into the storage bottle 13. To that end, as shown in FIGS. 6A-6C, some embodiments of the portable fixture 210 may include a vacuum controller 610 (e.g., a vacuum control knob) that allows a user to adjust the vacuum in order to reduce or eliminate foaming due to an overly vigorous flow (e.g., by reducing the velocity at which the solution falls into the storage bottle 13). The controller 610 regulates the vacuum to the vacuum collar 14 to precisely control pressure within the storage bottle 13. The vacuum controller 610 may have a detented OFF position when it is turned fully counter-clockwise, which vents the system to atmosphere or otherwise shuts off the vacuum so that no vacuum pressure is applied to the vacuum collar 14. An initial low vacuum ON position may be created by turning the vacuum controller 610 from the OFF detent clockwise about 5-15° to start applying a low vacuum to the vacuum collar 14 and create a small amount of negative pressure in the storage bottle 13. This creates an initial pressure differential across the sample filter 12 within the filtration device 10 to start pulling sample liquid through the filter into the sample bottle. Continuing to turn the vacuum controller 610 further clockwise increases the vacuum to the vacuum collar 14 until some maximum source vacuum is reached when turned a full 180° clockwise. The vacuum controller 610 can work with as little as 5" Hg source vacuum up to maximum vacuum (i.e. 29.9" Hg vacuum). Mechanisms for vacuum control are well known in the art. Any such controllers including diaphragm vacuum regulators, needle valve meters or other vacuum regulators may be used and are within the scope of the present invention.

As is known in the art, splashing and foaming within the storage bottle 13 may also be reduced by causing liquid drawn through the filter to flow along a sidewall of the storage bottle 13. By flowing along the sidewall the liquid is less likely to splash as compared to liquid falling vertically down into a pool of collected liquid sample. To that end, some embodiments of the present invention may include a hinge or universal joint located between the cradle portion 230 and the clamping portion 220. The hinge/universal joint allows the cradle portion 260 to pivot with respect to the clamping portion 220, thereby tilting the filtration device 10 to a non-vertical angle. Therefore, during the filtration process, the filtered liquid will run along the sidewall of the storage bottle 13 as opposed to falling vertically down, splashing, and generating foam.

Figure 7:
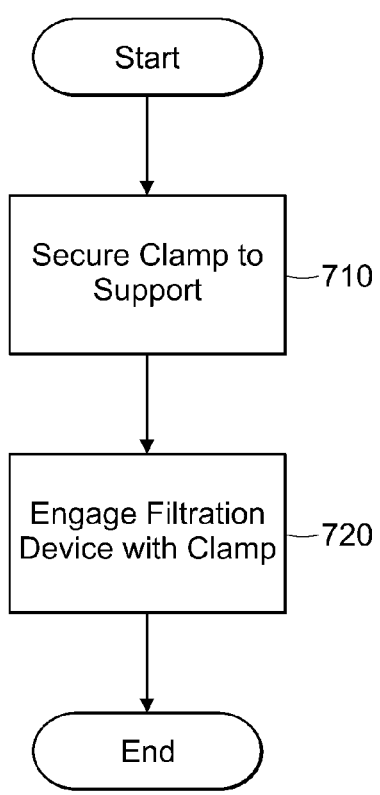
FIG. 7 shows a flowchart showing the steps of a method of using the portable fixture shown in FIGS. 2A-2C and 6A-6C to support a filtration device in accordance with embodiments of the present invention.

FIG. 7 schematically shows a flowchart depicting a method of using the above described portable fixture 210 for supporting a filtration device 10. In particular, the method first secures the portable fixture 210 to the support 310 (Step 710). As discussed above, a user can secure the portable fixture 210 to the support 310 by placing the recess 225 in the clamping portion 220 over the support 310 and adjusting the clamping screw 240 so that the end 246 of the screw 240 tightens against the support arm 312. Once the portable fixture 210 is secured to the support 310, the user may then engage/dock the filtration device 10 with the portable fixture 210 (Step 720) by sliding the vacuum collar 14 into the cradle portion 230 such that the arms 234A/B of the cradle portion 230 are around the vacuum collar 14 (or within the loading channel 340) and support the filtration device 10 from the underside of the sample reservoir 11. If the filtration device 10 and portable fixture 210 have the registration details described above, the registration details will help align the filtration device 10 such that the vacuum port 505 on the filtration device 10 is aligned with the vacuum outlet port 260 and sealed against the gasket 270. Otherwise, the user must manually ensure that the vacuum port 505 is aligned with the vacuum outlet port 260. Additionally, if the portable fixture 210 is so equipped, the user may then pivot the cradle portion 230 with respect to the clamping portion 220 (e.g., about the universal joint or hinge described above) to tilt the filtration device 10.

Figure 8:
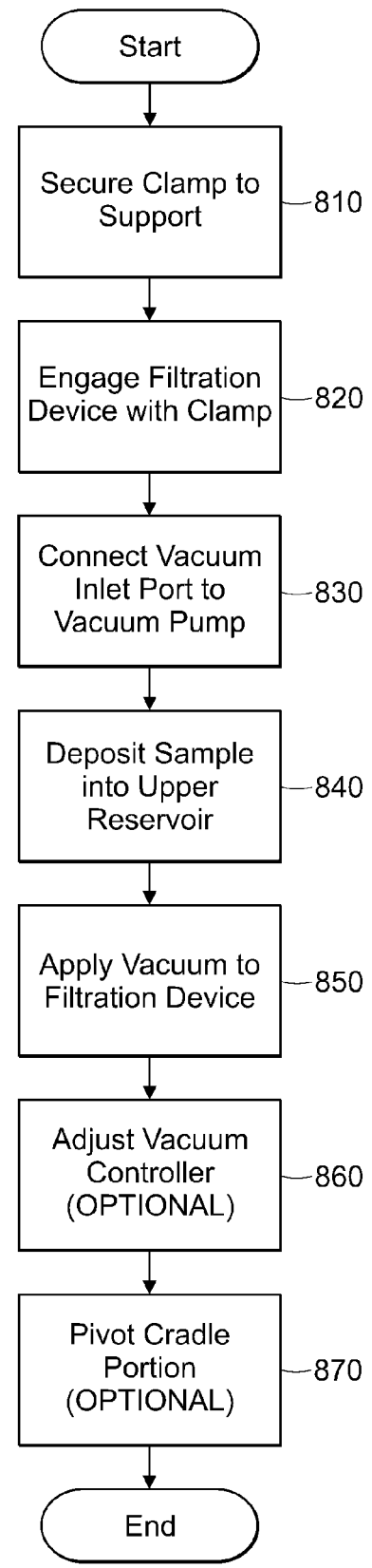
FIG. 8 shows a flowchart showing the steps of a method of filtering a liquid sample using the portable fixture shown in FIGS. 2A-2C and 6A-6C in accordance with embodiments of the present invention.

FIG. 8 schematically shows a flowchart depicting a method of using the above described portable fixture during liquid filtration. First, the method must secure the portable fixture 210 to the support 310 (Step 810) and engage the filtration device 10 with the portable fixture 210 (Step 820), as described above with respect to FIG. 7. Once the portable fixture 210 is secured to the support 310 and the filtration device 10 is engaged, the method may then connect the vacuum inlet port 250 located on the portable fixture 210 to a vacuum pump, for example, using a hose 330 (Step 830). As described above, the vacuum inlet port 250 is fluidly connected to the vacuum outlet port 260 by a vacuum channel. Therefore, any vacuum or positive pressure applied to the vacuum inlet port 250 is transferred to the filtration device 10 when engaged.

The method may then deposit the liquid sample to be filtered into the upper reservoir 11 of the filtration device 10 (Step 840). Please note that, although this step is described as occurring after the pump connection, the liquid can be added to the reservoir 11 before the pump is connected. The method may then turn on the vacuum pump and apply a vacuum to the filtration device 10 via the vacuum inlet port 250 and the vacuum outlet port 260 (Step 850). Once the vacuum is applied to the filtration device 10, the filtration device will begin to filter the liquid sample from the upper reservoir 11, through the filter 12, and into the storage bottle 13.

If the filtered liquid is foaming within the storage bottle 13 the method may include various optional steps to control and/or minimize the amount of foaming. For example, if the portable fixture 210 includes a vacuum controller 610, the user may adjust the vacuum controller 610 (Step 860) to reduce and/or adjust the amount of vacuum applied to the filtration device 10. As the vacuum decreases, the flow through the filtration device 10 and the foaming decrease. Additionally or alternatively, if the portable fixture 210 includes the hinge/universal joint described above, the method may pivot the cradle portion 230 with respect to the clamping portion 220 (Step 870). As described above, this will cause the filtration device 10 to sit at an angle and the filtered liquid to flow along a sidewall, which also decreases the amount of foaming.

It should be appreciated by those in the art that embodiments of the above described invention provide users with a portable fixture 210 that may be used with standard lab equipment (e.g., ring stands) to support a filtration device 10. When in use, the user need only attach the portable fixture 210 to a ring stand 310, which are standard lab equipment in many laboratories. Once the filtration is complete, the user may simply remove the portable fixture 210 and store it (e.g., in a draw or cabinet in the laboratory). Because the user is able to use existing lab equipment and may store the portable fixture 210 when not in use, the user need not take up additional bench space with additional equipment.

Although various exemplary embodiments of the invention have been disclosed, it should be apparent to those skilled in the art that various changes and modifications can be made without departing from the spirit and scope of the invention. It is intended that such changes and modifications be covered by the following claims.

What is claimed is:

1. A portable fixture for supporting a vacuum filtration device comprising:
   a cradle portion having at least one supporting surface configured to support the vacuum filtration device;
   a clamping portion for removably attaching the portable fixture to a support;
   a vacuum inlet port; and
   a vacuum outlet port fluidly connected to the vacuum inlet port.

2. A portable fixture according to claim 1 further comprising:
   a securing mechanism located on the clamping portion and configured to be tightened and loosened, thereby securing and unsecuring the portable fixture to the support.

3. A portable fixture according to claim 2, wherein the securing mechanism is a clamping screw passing through the clamping portion and configured to engage the support.

4. A portable fixture according to claim 1, wherein the vacuum inlet port includes a hose barb for receiving a hose connected to a vacuum.

5. A portable fixture according to claim 1, wherein the vacuum outlet port is configured to engage a vacuum port on the vacuum filtration device.

6. A portable fixture according to claim 5, wherein the vacuum outlet port includes a seal disposed around the vacuum outlet port and configured to minimize leakage between the vacuum outlet port and the vacuum port on the filtration device.

7. A portable fixture according to claim 1 further comprising a vacuum controller configured to control a vacuum pressure supplied to the filtration device through the vacuum outlet port and the vacuum inlet port.

8. A portable fixture according to claim 7, wherein the vacuum controller is a knob located on the cradle portion.

9. A portable fixture according to claim 8, wherein the vacuum control knob has a detented OFF position for venting to atmosphere so that no vacuum pressure is provided to the filtration device.

10. A portable fixture according to claim 1, wherein the cradle portion includes registration details for orienting the vacuum filtration device on the portable fixture.

11. A portable fixture according to claim 10, wherein the registration details include at least one support surface located on the cradle portion of the portable fixture configured to support a corresponding surface on the vacuum filtration device.

12. A portable fixture according to claim 1, wherein the support is a ring stand.

13. A portable fixture according to claim 1, wherein the cradle portion is moveable relative to the clamping portion so as to hold the filtration device at a tilted non-vertical angle.

* * * * *